US008290970B2

(12) United States Patent
Hohmann, II et al.

(10) Patent No.: US 8,290,970 B2
(45) Date of Patent: Oct. 16, 2012

(54) SYSTEM AND METHOD FOR OFFERING ONE OR MORE DRIVERS TO RUN ON THE COMPUTER

(75) Inventors: Richard K. Hohmann, II, Chelmsford, MA (US); Ralph E. Rocco, Groton, MA (US); Ronald W. Nasman, Winchendon, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2449 days.

(21) Appl. No.: 10/880,009

(22) Filed: Jun. 29, 2004

(65) Prior Publication Data
US 2005/0289177 A1 Dec. 29, 2005

(51) Int. Cl.
*G06F 17/30* (2006.01)
(52) U.S. Cl. .................... 707/758; 707/781
(58) Field of Classification Search ........... 709/203, 709/327; 717/173; 707/103, 100, 104.1, 707/200, 758, 781; 713/1; 395/284
See application file for complete search history.

(56) References Cited

U.S. PATENT DOCUMENTS

| 5,630,076 A * | 5/1997 | Saulpaugh et al. ........... 710/104 |
| 5,696,975 A * | 12/1997 | Moore et al. ................. 717/168 |
| 5,732,266 A * | 3/1998 | Moore et al. ..................... 713/1 |
| 6,567,860 B1 * | 5/2003 | Maxwell et al. .............. 719/327 |
| 6,714,964 B1 * | 3/2004 | Stewart et al. ............... 709/203 |
| 2002/0073415 A1 * | 6/2002 | Kim et al. ...................... 717/173 |
| 2002/0138567 A1 * | 9/2002 | Ogawa .......................... 709/203 |
| 2003/0065773 A1 | 4/2003 | Aiba et al. |
| 2003/0184784 A1 | 10/2003 | Ferlitsch |
| 2004/0054630 A1 * | 3/2004 | Ginter et al. .................... 705/53 |
| 2004/0221146 A1 * | 11/2004 | Baumann .......................... 713/1 |

OTHER PUBLICATIONS

Microsoft Corporation, "Staying up-to-date," Apr. 21, 1999, 1 p. [online] http://www.microsoft.com/windows98/usingwindows/maintaining/articles/811Nov/MNTfoundation3.asp.
Microsoft Corporation, "Support, Critical Updates, Windows Update," Apr. 21, 1999, 1 p. [online] http://www.microsoft.com/windows98/support/critical/default.asp.

* cited by examiner

*Primary Examiner* — James Trujillo
*Assistant Examiner* — Linh Black

(57) ABSTRACT

In accordance with at least some embodiments of the invention, a computer-implemented method, and associated apparatus, comprises determining a configuration of a computer, comparing the computer's configuration to configuration information in a database, and based on the comparison, offering a user at least one driver from which to select for running on the computer. In accordance with other embodiments, a computer-implemented method, and associated apparatus, comprises, in response to a user selecting a software control, determining if extended memory exists above a maximum amount of memory permitted by an operating system, and if extended memory exists, automatically making accessible the extended memory.

24 Claims, 3 Drawing Sheets

SYSTEM AND METHOD FOR OFFERING ONE OR MORE DRIVERS TO RUN ON THE COMPUTER

BACKGROUND

Computers typically have a variety of aspects that can be configured to suit the individual needs of a user. Examples of such configurable aspects include the amount of memory that is used in the computer and the device drivers that run on the computer. All else being equal, more memory generally leads to better performance. Computers typically have various peripheral device, such as graphics cards, that function with the assistance of drivers. A driver comprises software that executes on the computer's processor to enable operation of the device. Again, all else being equal, one driver may permit the computer to function more acceptably (e.g., faster) with a certain device than another driver or a different version of the same driver. Forcing a user to manually configure the computer in these regards (i.e., memory and device drivers) is generally inconvenient to the user.

BRIEF SUMMARY

In accordance with at least some embodiments of the invention, a computer-implemented method, and associated apparatus, comprises determining a configuration of a computer, comparing the computer's configuration to configuration information in a database, and based on the comparison, offering a user at least one driver from which to select for running on the computer.

In accordance with other embodiments, a computer-implemented method, and associated apparatus, comprises, in response to a user selecting a software control, determining if extended memory exists above a maximum amount of memory permitted by an operating system, and if extended memory exists, automatically making accessible the extended memory.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

In accordance with various embodiments of the invention, an automated tuning mechanism is described below that enables an electronic system such as a workstation or other type of computer system to be tuned for increased performance. In at least one embodiment, the tuning mechanism comprises an executable utility program that functions to permit a user to select a suitable device driver given the particular configuration of the user's workstation. The utility program also may be used to permit a user to automatically activate the use of a larger amount of memory for the workstation. The following discussion first addresses an embodiment in which the tuning mechanism facilitates selection of a suitable driver and afterwards, addresses a memory activation embodiment.

Figure 1:
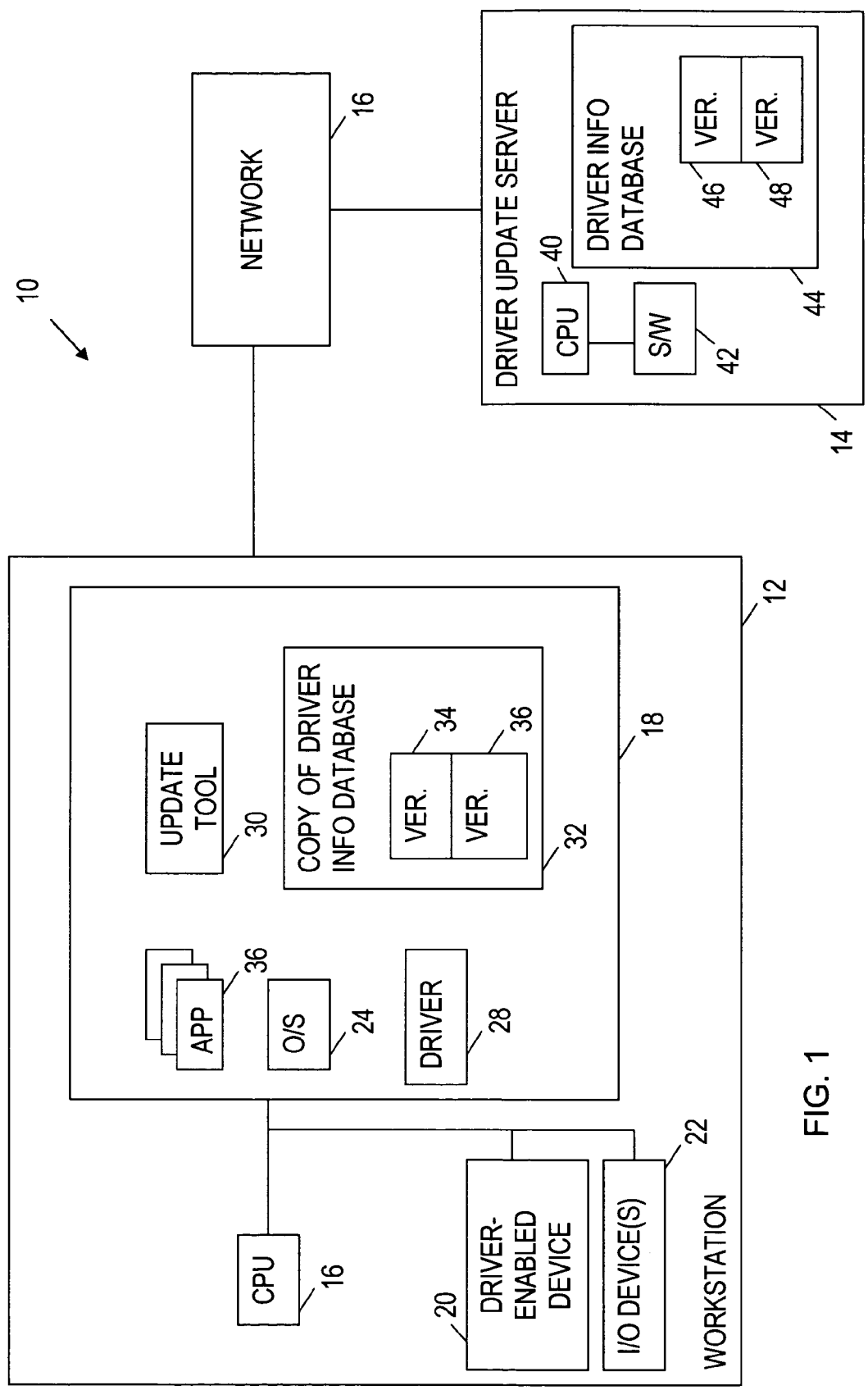
FIG. 1 shows a system in accordance with an exemplary embodiment of the invention.

Referring to FIG. 1, a system 10 is shown as comprising a workstation 12 coupled to a driver update server 14 via a network 16. The workstation 12 generally comprises a central processing unit ("CPU") 16, storage 18, a driver-enabled device 20, and one or more input/output ("I/O") devices 22 coupled together as shown. The CPU 16 executes one or more of the executable files provided on storage 18. Storage 18 comprises a variety of types of volatile and non-volatile storage media such as dynamic random access memory ("DRAM"), read only memory ("ROM"), and a hard disk drive. Driver-enable device 20 comprises any type of device that the CPU 16 can operate by execution of a driver such as driver 28 provided in the storage 12. A non-limiting example of device 20 is a graphics card. The I/O device(s) 22 comprises at least one device that permits a user to interact with the workstation and, as such, may include a display, a keyboard and a mouse. In general, the workstation 12 comprises a user-operated computer.

The driver update server 14 may also comprise a computer and, as such, also may include a CPU 40 that executes software 42. Because, as described below, server 14 may function to update the driver 28 that runs on the workstation 12, the server 14 is labeled as a "driver update" server. However, the server 14 may perform additional functions as desired and thus is not limited exclusively to the function of updating workstation drivers. The driver update server also includes a driver information database 44 as shown and discussed below. In general, the workstation 12 communicates with the server 14 via the network 16. The network 16 may comprise the Internet or other suitable network connectivity. There is no limitation on geographical proximity of workstation 12 relative to driver update server 14.

Referring still to FIG. 1, the storage 18 of the workstation 12 stores an operating system 24, one or more applications 26, driver 28, an update tool 30, and a copy 32 of the driver information database 44. The operating system 24 may comprise any suitable operating system and is loaded during initialization of the workstation. The applications 26 are whatever applications the user desires to run on the workstation such as computer-aided design ("CAD") and surface rendering applications. As noted above, the driver 28 is an executable code that permits the CPU 16 to control the device 20. In general, there may be more than one driver or driver version that can be used to operate the device 20. The embodiments provided herein describe an automated process to facilitate the user's selection of a suitable driver 28 to run on the workstation.

The driver information database 44 accessible to the driver update server 14 includes information that relates to one or more drivers and various workstation configurations for which the drivers are determined to function acceptably. What comprises acceptable performance may vary from person to person and thus may be subjectively determined. In some embodiments, acceptable performance may mean that the device 20 can be operated without error. In other embodiments, acceptable performance may require that a certain level of performance be achieved. In general, no restrictions are made as to what comprises acceptable driver functionality.

The database 44 includes references to one or more drivers and, for each driver, one or more workstation configurations that are determined to permit the referenced driver to function acceptably. The workstation configuration information for each driver may include any one or more of the following pieces of information: an application name and version, an operating system name and version, workstation model, device model and device driver. The device model refers to the model of a device for which the driver is intended to operate. For example, a certain graphics driver may be specified in the database as working acceptably with a certain application and version, a certain operating system and version, a certain model workstation, and a certain graphics card.

Figure 2:
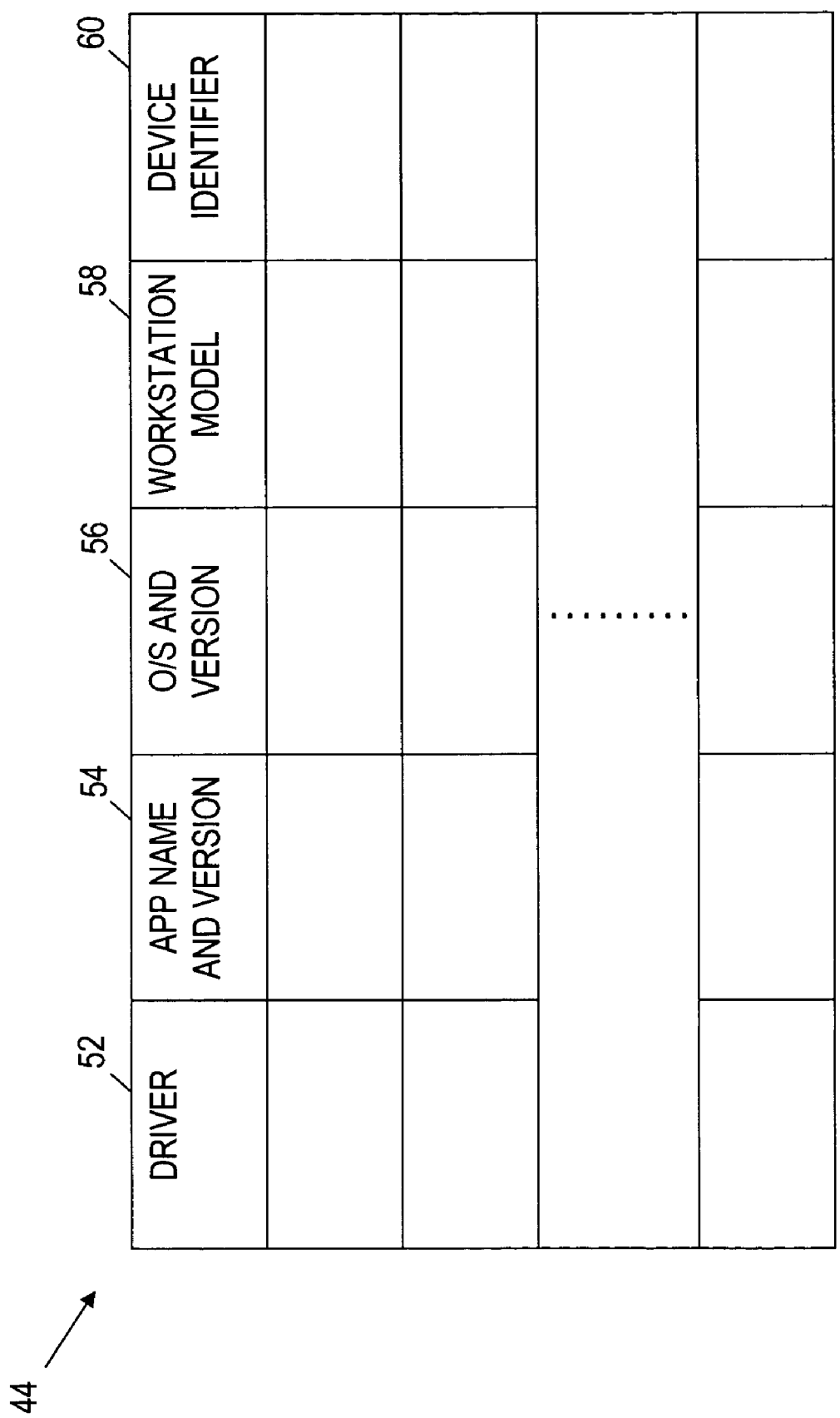
FIG. 2 shows an exemplary representation of a driver information database usable in the system of FIG. 1.

The format of the information contained in the driver information database 44 can be any format desired. FIG. 2 depicts a block representation of the database 44. Each driver 52 listed in the database has an associated set of configuration items. The associated configuration items include application name and version 54, operating system and version 56, workstation model 58, and driver-enabled device 60. A particular driver may be determined to function acceptably with more than one set of configuration items and these multiple entries may exist in database 44 for a single driver.

Figure 3:
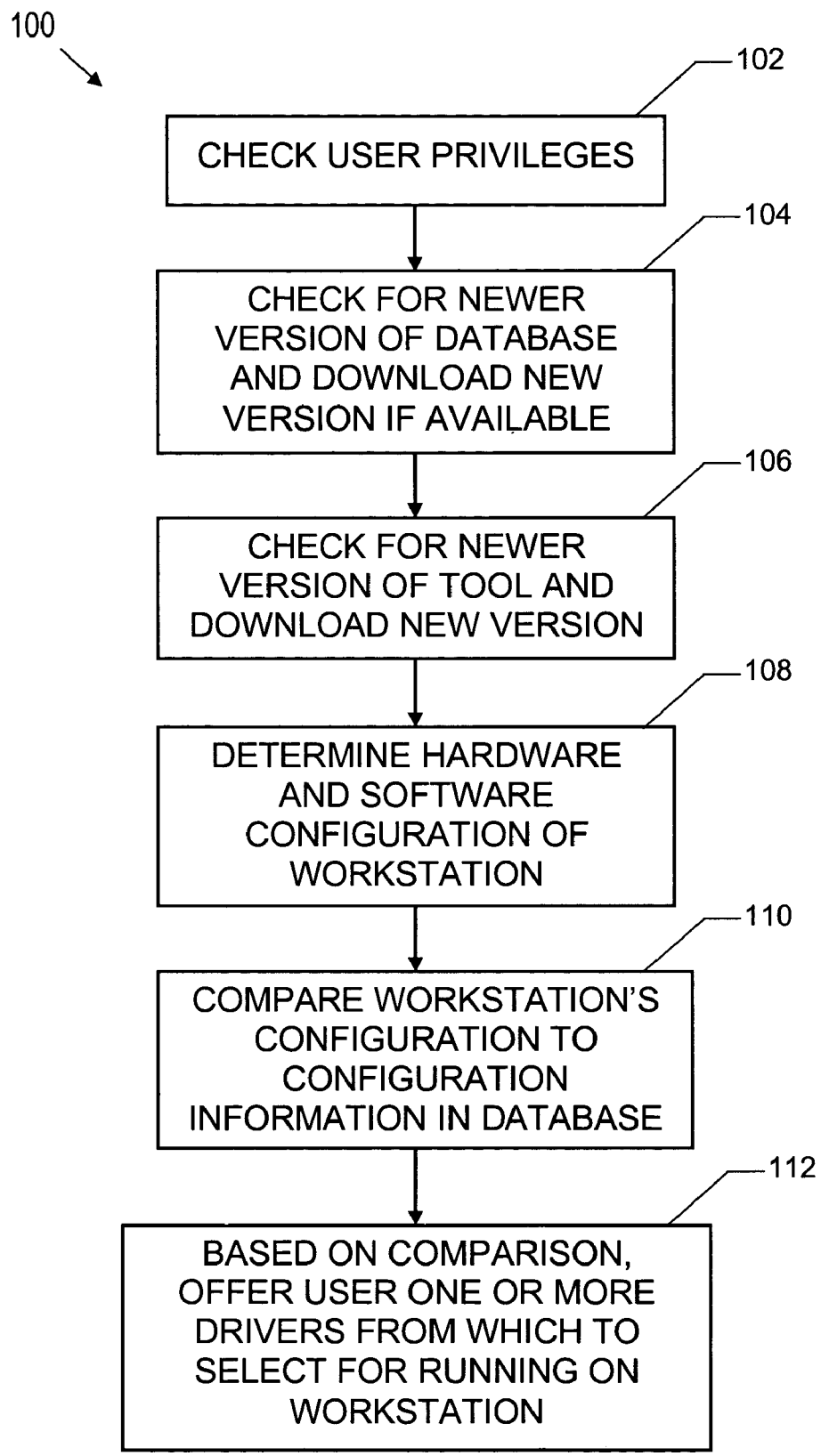
FIG. 3 illustrates a method in accordance with an exemplary embodiment of the invention.

Referring again to FIG. 1, in accordance with exemplary embodiments of the invention, the workstation 12 includes an update tool 30. The CPU 16 executes the tool 30. In general, the update tool 30 may be stored on a computer-readable medium (e.g., memory, compact disk read only memory ("CD ROM"), hard disk drive) and comprises an executable program configured to run on a CPU to perform various acts as described herein. The tool 30 may be pre-loaded on the workstation 12 and/or may be downloaded from a server such as server 14 via the network. FIG. 3 illustrates an exemplary method 100 that is performed by the update tool 30. The various acts depicted in FIG. 3 are thus performed by the processor 16 executing the update tool 30.

In FIG. 3, method 100 comprises acts 102-112 and the order of the acts can be varied from that shown. At 102, the update tool 30 checks the privileges of the user that is logged on to the workstation and/or the workstation's operating system 24. The method of FIG. 3 applies to other types of computer system's besides workstations. A user may log on in accordance with known techniques. Some users may be granted different levels of privileges to control the use of the workstation, to control the user's ability to re-configure the workstation, and to control the user's access to network resources. As such, the update tool 30 may require that the user have a certain privilege level to update the driver 28. For example, permission to update the workstation's driver 28 may be afforded only to users having administrative privileges.

As noted above, a copy 32 of the driver database 44 is stored on the storage 18 of workstation 12. The copy 32 may be pre-loaded onto the workstation and the example illustrated includes at least two version values 34 and 36. Version value 34 is indicative of the version of the database copy 32 on the workstation and version value 36 is indicative of the version of the update tool 30 currently loaded onto the workstation. The driver information database 44 on the driver update server 14 includes a corresponding pair of version values 46 and 48 in the embodiment shown. Version value 46 is indicative of the version of the database 44 currently stored on the driver update server 14. Version value 48 is indicative of the most current version of the update tool that is available to be run on the workstation. As such, by comparing version values 34 and 46, an assessment can be as to whether the most current version of the driver information database is loaded onto the workstation 12. Similarly, by comparing version values 36 and 48, an assessment can be made as to whether the most current version of the update tool 30 is loaded onto the workstation 12.

At 104 in FIG. 3, the update tool 30 determines whether a newer version of the driver information database exists by comparing the version 34 stored in the workstation 12 with the version value 46 obtained from the driver update server 14. If this comparison results in a determination that the workstation already has the most current copy of the database 44, then no further action is taken in this regard and control passes to 106. If, however, the comparison of version values 34 and 46 results in a determination that the workstation does not have the most current copy of the database 44, then the update tool 30 causes the server 14 to download a new copy of the driver information database 44 to the workstation. The update tool 30 may save the newly received copy of the driver information database over the previous copy in storage 18. Downloading a new copy of the database 44 to the workstation 12 may also include downloading a new copy of the update tool itself to the workstation.

At 106, the update tool 30 may also determine whether a newer version of the update tool exists. This determination can be performed by comparing the version value 36 from the workstation with the version value 48 obtained from the server 14. If the version values match, then no further action is taken in this regard and control passes to 108. If, however, the comparison of version values 36 and 48 results in a determination that the workstation 12 does not have the most current version of the update tool, then the workstation causes the server 14 to download the current update tool to the workstation for execution thereon. In the event a new version of the update tool is downloaded to the workstation, the newly downloaded tool may be run thereby causing one or more of the acts already performed in FIG. 3 to be performed again.

At 108, the update tool determines the hardware and software configuration of the workstation 12. The hardware configuration may comprise one or more of the parameters in the driver information database such as the workstation model and device identifier. Other hardware-related configuration items may include CPU speed, the capacity of storage 18 and any other desired parameters that may have a bearing on the choice of a suitable device driver. The software configuration determined in 108 may comprise an identification of the various applications 26 (and their version designations), an identification of the operating system 24 and its version designation, an identification of the device driver 28 and version, and any other desired parameters that may have a bearing on the choice of a suitable device driver.

Once the workstation's hardware and software configuration is interrogated, at 110 the update tool 30 compares the workstation's configuration to the configuration information included in the copy 32 of the driver information database. At 112, based on the comparison, the update tool 30 may offer to the user via I/O device(s) 22 a choice of one or more device drivers that the update tool determines may be acceptable for execution on the user's workstation. The comparison may entail determining the identify of driver 28 that is currently installed on the workstation and comparing the workstation's configuration to configuration information in the copy 32 of the driver information database to determine if any drivers are provided in the database that are suitable to be used with the same device 20 to which the driver 28 is used. The drivers in the database that are determined to match some or all of the workstation's configuration items are presented to the user via I/O device(s) 22 so that the user can select one of the driver's if the user is inclined. One driver in the database may match to all applications that currently run on the workstation, while another driver may match some, but not all, of the workstation's applications. In at least one embodiment, the order of drivers presented to the user on the I/O device 22 may begin with the driver(s) that can run acceptably with a larger number of workstation configuration parameters, such as applications, than other matching drivers.

One of the driver choices may be the driver 28 already installed and running on the workstation. The update tool 30 may visually mark that driver in any suitable manner so as to inform the user that the marked driver is already running on the workstation. Presumably, the user will choose not to download the same driver already running on the workstation. However, if desired, the user is permitted to download the same driver. Further, the user could choose to download any driver that is not currently running on the workstation. If a user chooses to download a driver, the driver may be downloaded to the workstation 12 from the driver update server 14 or from another location as specified in the copy 32 of the driver information database.

In accordance with another embodiment of the invention, the update tool 30 can be used to tune the workstation for a different amount of memory than is currently installed and accessible. Some or all of storage 18 is implemented in the form of random access memory ("RAM"). In at least some operating systems, absent certain configuration procedures, only a predetermined maximum amount of RAM can be accessed by the operating system. Without performing the aforementioned configuration procedures, any memory installed in excess of the predetermined amount (referred to herein as "extended" memory) is not accessible to the operating system. In this embodiment of the invention, an extended amount of memory can be installed and, through the update tool 30, automatically activated to be accessible to the operating system. The following discussion assumes that extended memory has already been physically installed into the workstation.

The update tool 30 provides a graphical user interface via I/O device(s) 22 that includes a selectable software button that, when activated by a user of the workstation, causes one or more configuration actions to be performed on the workstation to activate extended memory. One or more of the configuration actions to activate the extended memory are generally operating system-specific and thus depend on the particular operating system 24 running on the workstation.

One of the actions that may be performed or caused to be performed by the update tool 30 is to determine the amount of RAM available (including extended memory) in the workstation 24. Once this determination is made, the update tool 30 can cause the extended memory to be activated to the limit of what is possible under the operating system 24 and to the limit of the amount of RAM currently available. If the user has not installed any extended RAM, yet selects the software button to cause the update tool 30 to try to activate extended memory, this action will preclude the workstation from incorrectly configuring itself for memory that does not exist.

Another action that may be performed or caused to be performed is to modify the workstation's boot file to add an instruction or parameter that permits the extended memory to be made accessible. On a subsequent boot of the workstation 24, this boot file modification may cause the user to be provided with a choice as to whether the user desires to activate the extended memory. If the user opts to activate the extended memory, the boot process continues and makes the extended memory accessible in accordance with memory requirements of the workstation's operating system. Otherwise, the boot process continues without making the extended memory accessible. Another action that may be performed to activate the extended memory is to modify the header of one or more of the applications 36 running on the workstation to permit the application(s) to execute in a way so as to use the extra memory. This action naturally is specific to the particular application(s) running on the workstation.

If extended memory has been made accessible via the update tool 30, the user may subsequently desire to deactivate use of the extended memory. As such, the user may run the update tool and select a software button (which could be the same selectable software button noted above) to disable use of the extended memory. In general, the actions performed to activate the extended memory are reversed to deactivate the extended memory. As for activating the extended memory, the actions to deactivate the extended memory are operating system-specific.

What is claimed is:

1. A computer-implemented method, comprising:
   determining a configuration of a computer, said configuration comprising an item selected from a group consisting of a hardware configuration item, an operating system identifier, and an application with which a driver interacts;
   comparing the computer's configuration to configuration information in a database; and
   based on the comparison, offering a user at least one driver from which to select for running on the computer,
   wherein offering the user at least one driver comprises offering a plurality of drivers in order of the number of applications that each of the plurality of drivers can run acceptably.

2. The method of claim 1 wherein said hardware configuration item comprises an item selected from a group consisting of a model of the computer, driver-controller devices installed in the computer, processor speed, and capacity of a storage device.

3. The method of claim 1 further comprising providing a copy of the database to the computer from a remote server and performing the comparison using the copy of the database.

4. The method of claim 1 wherein comparing the computer's configuration information to a database comprises comparing the computer's configuration information to a database that comprises computer configuration items for each of a plurality of executable drivers.

5. The method of claim 4 wherein offering the user, based on the comparison, at least one driver comprises determining matches between the computer's configuration and the configuration items in the database.

6. The method of claim 1 further comprising downloading a driver to the computer based on a user selection of at least one driver offered to the user.

7. A computer-implemented method, comprising:
in response to a user selecting a software control, determining if extended memory exists above a maximum amount of memory permitted by an operating system;
if said extended memory exists, automatically making accessible said extended memory; and
automatically deactivating said extended memory in response to the user selecting a software control.

8. The method of claim 7 wherein automatically making accessible said extended memory comprises at least one action selected from a group consisting of modifying a boot file associated with the computer and modifying a header of at least one application loaded on the computer.

9. A system having a configuration, comprising:
a storage coupled to a processor and on which configuration information and an update tool are stored;
said update tool being executable by a central processing unit ("CPU") to cause the CPU to compare the system's configuration comprising an item selected from a group consisting of a hardware configuration item, an operating system identifier, and an application with which a driver interacts to the stored configuration information to generate, based on the comparison, a list of at least one driver,
wherein the list of at least one driver comprises a list of a plurality of drivers in order of the number of applications that each of the plurality of drivers can run acceptably.

10. The system of claim 9 wherein said update tool further causes the processor to determine if another version of the update tool is available to be downloaded to said system.

11. The system of claim 9 wherein said update tool further causes the processor to determine if another version of the configuration information is available to be downloaded to said system.

12. A system, comprising:
a central processing unit ("CPU") on which an update tool is configured to execute; and
storage coupled to the CPU, said storage adapted to receive extended memory, said extended memory comprising an amount of memory in excess of an operating system limit;
wherein said update tool being executable by said processor to cause the processor to automatically activate extended memory, if present, in said system and deactivate said extended memory, if activated, in response to the user selecting a software control.

13. The system of claim 12 wherein said update tool causes said CPU to determine if any extended memory exists in said system.

14. The system of claim 12 wherein said update tool causes said CPU to modify a boot file on said system.

15. The system of claim 12 wherein said update tool causes said CPU to modify a header of an application running on said system.

16. A computer-readable storage medium on which an executable program is stored that, when accessed by a processor, causes the processor to:
determine a configuration of a system containing said processor, said configuration comprising an item selected from a group consisting a hardware configuration item, an operating system identifier, and an application with which a driver interacts;
access predetermined configuration information stored on said system; and
generate a list of device drivers based on the system's determined configuration and the predetermined configuration information,
wherein the list of device drivers comprises a list of a plurality of drivers in order of the number of applications that each of the plurality of drivers can run acceptably.

17. The storage medium of claim 16 wherein the predetermined configuration information comprises device drivers and, associated with each such device driver, a set of system items, and wherein the executable program further causes the processor to generate the list of device drivers based on determining which device drivers, if any, in the predetermined configuration information have associated system items that match aspects of the system's determined configuration.

18. The storage medium of claim 16 wherein the executable program further causes the processor to automatically activate memory over a predetermined operating system threshold in response to a user input.

19. The storage medium of claim 16 wherein the executable program causes the processor to automatically activate memory by modifying a boot file.

20. The storage medium of claim 19 wherein the executable program further causes the processor to automatically activate memory by modifying a header of an executable application program.

21. The storage medium of claim 16 wherein the executable program further causes the processor to automatically deactivate memory over a predetermined operating system threshold in response to a user input.

22. A system, comprising:
means for determining a configuration of said system, said configuration comprising an item selected from a group consisting of a hardware configuration item, an operating system identifier, and an application with which a driver interacts;
means for accessing a predetermined configuration information stored on said system; and
means for producing a list of device drivers based on the system's configuration and the predetermined configuration information,
wherein the list of device drivers comprises a list of a plurality of drivers in order of the number of applications that each of the plurality of drivers can run acceptably.

23. The system of claim 22 further comprising means for activating memory in excess of a predetermined threshold in response to a user input.

24. The system of claim 22 further comprising means for deactivating memory in excess of a predetermined threshold in response to a user input.

* * * * *